United States Patent [19]

van der Klooster et al.

[11] Patent Number: 4,497,937

[45] Date of Patent: Feb. 5, 1985

[54] POLYMERS CONTAINING ORGANOTIN COMPOUNDS AND PAINT ON THE BASIS THEREOF

[75] Inventors: Jacob P. van der Klooster, Papendrecht; Johannes P. M. van Oosterbos, Maassluis, both of Netherlands

[73] Assignee: DSM Resins, B.V., Zwolle, Netherlands

[21] Appl. No.: 477,402

[22] Filed: Mar. 21, 1983

[30] Foreign Application Priority Data

Mar. 22, 1982 [NL] Netherlands ..................... 8201172

[51] Int. Cl.³ .............................. G08F 8/42
[52] U.S. Cl. .............................. 525/333.1; 525/359.1; 525/359.3; 525/359.4; 525/370
[58] Field of Search ................. 525/333.1, 370, 359.1, 525/359.3, 359.4

[56] References Cited

U.S. PATENT DOCUMENTS

| | | | |
|---|---|---|---|
| 3,821,187 | 6/1974 | Ichikawa et al. | 525/333.1 |
| 3,845,005 | 10/1974 | Freiman | 260/336 A |
| 3,925,511 | 9/1975 | Loveless | 525/333.1 |
| 4,380,599 | 4/1983 | Tootle-Kirby et al. | 525/370 |

FOREIGN PATENT DOCUMENTS

| | | |
|---|---|---|
| 644501 | 6/1964 | Belgium . |
| 2235601 | 2/1974 | Fed. Rep. of Germany . |
| 2401207 | 3/1979 | France . |

Primary Examiner—J. L. Schofer
Assistant Examiner—Bernard Lipman
Attorney, Agent, or Firm—Cushman, Darby & Cushman

[57] ABSTRACT

Polymers containing organotin compounds having advantageous use as paint binders obtained by reacting a cyclized rubber with organotin compounds of the formula $R_3$—Sn—O—Z wherein R represents a hydrocarbon group from 1 to 15 carbon atoms and Z is a phenolate group derived from a phenolic compound having from 6 to 15 carbon atoms. In marine applications paints incorporating such polymers remain un-fouled after extended use and are self-polishing. Such polymers are obtained by reacting cyclized rubber and an organotin compound at an elevated temperature in an inert solvent.

20 Claims, No Drawings

POLYMERS CONTAINING ORGANOTIN COMPOUNDS AND PAINT ON THE BASIS THEREOF

BACKGROUND AND SUMMARY OF THE INVENTION

The present invention relates to paints and polymers containing organotin compounds.

It is known to add germicides to marine paint to avoid undesired fouling by, for instance, algae, grasses and mollusks. Organotin compounds are often applied for this purpose. It is also known to link the organotin compound to a polymer via carboxylic acid groups and to apply such polymer containing organotin compounds in marine paint. On contact of the top coat with water, hydrolysis takes place and the biologically active organotin compound is released. A disadvantage of these products is that in most cases they are, as such, not suitable as paint binders.

An object of the present invention is to provide a polymer that contains organotin compounds. A further object is to provide a polymer containing organotin comounds that can be produced in a simple fashion and that can be applied as a binder in paint. An additional object is to provide a selfpolishing fouling-free paint.

According to the present invention such a polymer consists of a skeleton of cyclized rubber, carrying a plurality of pendant organotrn phenolate groups of the general formula $R_3$—Sn—O—Z, bonded via a carbon-carbon bond between the phenolate group and the cyclized rubber. Broadly stated, in the aforementioned formula R represents a hydrocarbon group or residue containing from 1 to 15 carbon atoms which is bonded directly to the metal and Z represents a group derived from a phenolic compound containing from 6 to 15 carbon atoms. Tin (Sn) is the metal. These polymers containing organotin comounds can be prepared in a simple fashion.

The present polymers can replace unmodified cyclized rubber as a paint binder. The top coats obtained when applying paint containing the polymer binders of the present invention are self-polishing and remain smooth and free from fouling for a very long time.

DESCRIPTION OF THE INVENTION

The active metal compound is present in the form of organotin phenolates having the general formula $R_3$—Sn—O—Z.

In this formula, Z represents a group that is derived from a phenolic compound containing from 6 to 15 carbon atoms. The phenolic compound includes, for example, (i) phenol itself, (ii) monoalkylphenols such as, for example, n-butyl phenol, n-nonyl phenol, isopropyl phenol, amyl phenol, octyl phenol and cresole; (iii) polycyclic phenols such as, for example, α-naphtol; (iv) substituted phenols such as, for example, chlorophenol and gualacol; (v) polyphenols such as, for example, resorcinol; and (vi) arylphenols such as, for example, p-phenyl phenol. In most cases Z is derived from phenol or from an alkylphenol, such as a 7-15 carbon alkylphenol.

In the above formula, R represents a hydrocarbon group or residue containing from 1 to 15 carbon atoms. For example, this may be (i) an alkyl group, such as a methyl, n-propyl, iso-propyl, n-butyl amyl, octyl or nonyl group; (ii) an aryl group such as a phenyl, benzyl or cresyl group; or (iii) a cycloalkyl group such as cyclohexyl. The three hydrocarbon groups bonded to the tin atom are usually identical, but they may also differ from one another. By preference R is a $C_{3-6}$ alkyl, a cycloalkyl group, or a phenyl group.

The tin content of the polymer (calculated as metallic tin relative to the entire polymer) may be between about 1.5 and about 20 wt. %. In most cases a polymer having a tin content of between about 2.5 and about 15 wt. % is desired. In particular, a tin content of between about 5 and about 10 wt. % is preferred.

The skeleton of the tin-containing polymer consists of cyclized rubber. For discussion purposes the phrase "rubber polymer" may be employed. Cyclized rubber is understood to mean products that can be considered derivatives of isoprene. Such rubber polymers contain a large amount of condensed or non-condensed cyclohexane rings and are saturated, or at most slightly unsaturated. Cyclized rubber can be obtained by heating natural rubber or a synthetic polyisoprene in the presence of an acid catalyst. Among the catalysts that may be used are for instance, sulphuric acid, p-toluene sulphonic acid, phosphoric acid, boron trifluoride, aluminum chloride or tin tetrachloride. A cyclized rubber polymer containing pendant phenol residues linked to the rubber polymer by carbon-carbon bonds can be obtained by having the cyclization take place in a solvent to which an amount of a phenol has been added, or by using a melted phenol as reaction medium. One such relevant process is described in German patent No. 675564, the disclosure of which is hereby incorporated by reference. Suitable phenolic compounds include the compounds previously mentioned relating to the phenolate group. By preference phenol itself or an alkylphenol is used. The content of the pendant phenolic groups in the cyclized rubber may be between about 2 to about 20 wt. % calculated on the substituted cyclized rubber. By preference the content of the phenolic groups is between about 3 and about 15 wt. %. In general, the molecular weight of the cyclized rubber polymer is between about 5,000 and about 50,000.

The polymers according to the invention can be prepared by reacting a phenol-substituted cyclized rubber with a suitable organotin compound.

The present polymers containing organotin compounds may be prepared by reacting a cyclized rubber containing phenolic groups bonded via a carbon-carbon bond with a suitable organotin compound, which compound is capable of etherification, at an elevated temperature in an inert solvent. The reaction proceeds readily even in the absence of an etherification catalyst. The reaction is carried out in a suitable inert solvent, preferably while heating the reaction mixture at about 50° C. to about 200° C. The water formed is discharged. The pressure is not important. Suitable inert hydrocarbon solvents include, for instance, aliphatic or aromatic hydrocarbons. Hexane, cyclohexane and benzene are exemplary solvents. In this preparation, the simplest procedure is to employ an amount of tin compound that roughly corresponds, on an equivalents basis, to the amount of phenolic hydroxyl groups available for bonding. If desired, a deficit of the tin compound, i.e. less than the equivalent to the available phenolic hydroxyl groups, may also be applied. The actual amount of tin compound employed can be determined by simple experiment.

Suitable organotin compounds are already well-known and include, for example, trihydrocarbyl tin oxide, a bis (trihydrocarbyl) oxide, and a tetrahydrocarbyl tin hydroxide or alkoxide can be used. Examples are bis (tri-n-butyl tin) oxide, triphenyl tin oxide, tricyclohexyl tin oxide, tri-n-propyl tin hydroxide, tri-n-butyl tin oxide.

Alternatively it is also possible to prepare polymers according to the present invention by starting from an organotin halide, e.g. a chloride. In this case, it is preferred to first convert the phenolic hydroxyl groups bonded to the rubber polymer into alkali phenolate groups. After this, the rubber polymer can be reacted with the organotin chloride in an exemplary inert solvent under the general conditions as previously described. Thus, the tin-modified cyclized rubber is obtained with by-product production of the alkali chloride. The water soluble alkali chloride can easily be removed. Suitable organotin chlorides include, for example, tri-n-propyl tin chloride, tri-n-butyl tin chloride, tricyclohexyl tin chloride and triphenyl tin chloride. It should be understood that other organotin halides, such as bromides or fluorides, may also be employed intead of an organotin chloride.

In preparing the polymers according to the present invention it is understood that conventional apparatus may be used such as a resin kettle having: heating means, cooling means and stirring means, inlet ports for reactants and a reflex cooler with a trap therein for separating solvent and water so that the latter may be discarded.

The polymer containing organotin compounds according to the present invention can be successfully utilized as a paint binder. A distinct advantage is that the amount of plasticizer needed to be added to this binder is less than that required for an unmodified cyclized rubber paint binder. The amount of added plasticizer may even be zero. The polymer containing organotin compounds is especially suited for use in formulating marine paints because of its germicidal properties. In this context marine paint is understood to mean all paint applied on surfaces that are regularly or continuously in contact with water. Advantageously, paint that contains a polymer according to the invention as a binder can be used for, for instance, painting ship hulls, off-shore installations, pipe lines and piers. The paint is self-polishing, which means it slowly dissolves on contact with flowing water. Therefore the water resistance of a ship's hull coated with such a self-polishing paint remains minimized not only because there is no fouling but also because the top coat remains smooth.

From the germicidal standpoint, the rate at which the germicidal tin compound is released can optionally be decreased somewhat by applying, in addition to the present polymer containing organotin compounds, yet another polymer in the paint, for instance an unmodified cyclized rubber or by including a larger amount of chlorinated paraffin or another hydrolysis-retarding compound, plasticizing or not, in the paint.

By preference the said paint contains at least about 60 wt. %, and more particularly between about 70 wt. % and about 85 wt. %, calculated relative to the solids, of water-leachable components, i.e. material that dissolves in or is leached out by water, e.g. seawater. Water-leachable material comprises the polymer according to the invention, water-leachable pigments and fillers such as, in particular, zinc oxide, zinc chromate, cuprous oxide and copper acetoarsenite and possibly other water-soluble components. Besides the water-leachable pigments, the paint in most cases contains up to a total pigment volume of at most about 25 vol % of pigments that are insensitive to water. Furthermore, a thickener may be added and, if desired, other customary additives may also be added.

EXAMPLES

The following illustrative and non-limiting examples describe various embodiments so as to assist in understanding the present invention.

EXAMPLE I

A conventional resin kettle having heating means, cooling means, stirring means, inlet ports for reactants and a reflux cooler with a trap therein for separating solvent and water so that the latter may be discarded was used to prepare the following tin-containing polymer.

A tin-containing polymer was prepared in such a resin kettle by dissolving 100 kg of a cyclized rubber containing 10 wt. % phenol in 66.5 liters of white spirit and adding 30 kg bis(tri-n-butyl tin) oxide to the solution. While being stirred in a reaction veseel, the resultant solution was heated and refluxed for one hour at a temperature of between 150° C. and 180° C. at 1 bar. The released water was separated from the reflux and discharged. On cooling, a solution of a polymer containing 9.0 wt. % tin (calculated as metal relative to the solids) was obtained.

EXAMPLE II

The polymer obtained in Example I was used in formulating, in a conventional manner, of a number of paints. These paints, Nos. 1 through 6, had the compositions shown in Table 1.

TABLE 1

| Compositions of Paints 1 Through 6 (all figures representing parts by weight.) | | | | | | |
|---|---|---|---|---|---|---|
| | 1 | 2 | 3 | 4 | 5 | 6 |
| polymer solution per Example I | 20 | 24 | 16 | 18 | 24 | 20 |
| zinc oxide | 12 coll | 5 am | 20 ac | 20 am 40 ac | 48 am | 30 am |
| cuprous oxide | 58 | 61.3 | — | — | — | 30 |
| copper acetarsenite | — | — | 30 | — | 10 | — |
| lead oxide | — | — | 15 | — | — | — |
| red iron oxide | — | — | 3 | — | — | 3 |
| phthalocyanine green pigment | — | — | — | 2 | — | — |
| Bentone 34 | 0.4 | 0.4 | — | — | 0.5 | — |
| tributyl tin oxide | — | — | — | 3 | — | — |
| triphenyl tin chloride | — | — | — | — | 3 | — |
| Thixatrol ST | — | — | — | 0.2 | — | 0.4 |
| methanol | 0.1 | 0.1 | — | — | 0.1 | — |
| white spirit | 9.5 | 9.2 | 14 | 16.8 | 14.4 | 6.6 |
| dibutyl phthalate | — | — | 2 | — | — | — | am = amorphous
ac = acicular
coll = colloidal

For purposes of comparison, paints according to the present invention were matched in tests against a series of paint "controls".

A number of paints (controls) were prepared in the same way as the paints according to the present invention except that only a mixture of 92% unmodified cyclized rubber (the starting material as in Example I) and 8% chlorinated paraffin binder were used. These paints were applied to test panels measuring 12×38 cm which, after curing of the layer, were exposed to flowing seawater.

A like series of panels were similarly coated with the paint of the present invention having the formulations identified in Table 1.

After 15 months the panels coated with the paint according to the present invention still had an entirely smooth surface without any fouling. The controls were covered with a layer of barnacles and algae.

EXAMPLE III

A tin-containing polymer was prepared as described in Example I, starting from 100 kg of a cyclized rubber that contained 7 wt. % cresole, 66.5 kg white spirit and 17 kg bis(tri-n-propyl tin) oxide. The polymer obtained in this way contained 7 wt. % tin (calculated as metal relative to solids). This polymer solution, was also suitable for processing in paint.

EXAMPLE IV

Paint compoisitions were prepared, as described in Example II, using the polymer of Example III, and the composition of these paints, Nos. 7 and 8, was as follows:

TABLE II

| Compositions of Paints 7 and 8 (all figures representing parts by weight) | | |
| --- | --- | --- |
|  | 7 | 8 |
| Polymer solution | 25 | 30 |
| Zinc oxide amorphous | 10 | 8 |
| Zinc oxide colloid | 20 | 18 |
| Cuprous oxide | 40 | 30 |
| Triphenyltin fluoride | — | 10 |
| Bentone 34 | 0.2 | 0.2 |
| White spirit | 4.8 | 3.8 |

Panels coated with these paints were still unfouled and perfectly smooth after 5 months exposure to flowing seawater.

Results similar to Examples II and IV are obtained when other organotin halides are employed to prepare the tin-containing polymer.

The disclosure of The Netherlands application No. 8201172 from which this U.S. application claims priority is incorporated by reference herein.

While the invention has been described in connection with what is presently considered to be the most practical and preferred embodiments, it is understood that the invention is intended to include various modifications and equivalent polymers containing organotin compounds within the spirit and scope of the appended claims, which scope is to be accorded the broadest interpretation so as to encompass all such modifications and equivalent polymers, paints and processes.

We claim:

1. A polymer containing organotin compounds suitable for application as a paint binder, said polymer composed of:
a cyclized rubber polymer having a plurality of pendant phenolate groups of an organotin phenolate, said polymer carbon-carbon bonded to the phenolic residue of said organotin phenolate, said organotin phenolate having the general formula:

$$R_3\text{—Sn—O—Z}$$

wherein in said formula R represents a hydrocarbon group containing from 1 to 15 carbon atoms that is bonded directly to the tin (Sn) and Z represents a phenolic compound containing from 6 to 15 carbon atoms.

2. Polymer according to claim 1, wherein the metallic tin content of said polymer is between about 1.5 and about 20 wt. %.

3. Polymer according to claim 2 wherein said tin content is between about 2.5 and about 15 wt. %.

4. Polymer according to claim 3 wherein said tin content is between about 5 and 10 wt. %.

5. Polymer according to claim 1, wherein R is a 3 to 6 carbon alkyl group, a cycloalkyl group and/or a phenyl group and Z is derived from phenol or a 7 to 15 carbon alkylphenol.

6. Polymer according to claim 5 wherein R is a 3 to 6 carbon alkyl group.

7. Polymer according to claim 5 wherein R is a cycloalkyl group.

8. Polymer according to claim 5 wherein R is a phenyl group.

9. Polymer according to claim 5 wherein each R is the same.

10. Polymer according to claim 5 wherein Z is derived from phenol.

11. Polymer according to claim 5 wherein Z is a 7 to 15 carbon alkylphenol.

12. Polymer according to claim 9 wherein Z is derived from phenol.

13. Polymer according to claim 9 wherein Z is derived from a 7 to 15 carbon alkyl phenol.

14. Polymer according to claim 1 wherein R is a 3 to 6 carbon alkyl group, a cycloalkyl group or a phenyl group.

15. Polymer according to claim 1 wherein Z is derived from phenol or a 7 to 15 carbon alkylphenol.

16. A paint containing a polymeric paint binder including organotin compounds wherein said paint binder comprises a polymer consisting of a cyclized rubber having pendant organotin phenolate groups of the formula:

$$R_3\text{—Sn—O—Z}$$

bonded from Z of said organotin phenolate to said rubber by a carbon-carbon bond, wherein in said formula R represents a hydrocarbon group having from 1 to 15 carbon atoms bonded directly to the tin (Sn) and Z represents a phenolic compound containing from 6 to 15 carbon atoms.

17. Paint according to claim 16, wherein said paint contains between 70 weight % and 85 weight %, relative to the solids content of said paint, of water-leachable components, said components comprising said paint binder water-leachable pigments, and/or water-leachable fillers.

18. Paint according to claim 16, wherein: (i) R represents a $C_{3-6}$ alkyl or cycloalkyl group or a phenyl group, (ii) Z represents a group derived from phenol or from a $C_{7-15}$ alkylphenol, and (iii) the tin content of the binder is between about 2.5 and about 15 wt. %, calculated as metallic tin.

19. Paint according to claim 16 wherein R is a hydrocarbon selected from the groups consisting of: (i) methyl, n-propyl, iso-propyl, n-butyl, cyclohexyl, octyl, or nonyl; (ii) phenyl, benzyl, or cresyl; or (iii) cyclohexyl.

20. Paint according to claim 16, wherein said paint contains at least 60 weight %, relative to the solids content of said paint, of water-leachable components, said components comprising said paint binder, water-leachable pigments, and/or water-leachable fillers.

* * * * *